United States Patent Office 2,765,351
Patented Oct. 2, 1956

2,765,351

DEHYDROCHLORINATION PROCESS

Franklin Conrad, Baton Rouge, La., assignor to Ethyl Corporation, New York, N. Y., a corporation of Delaware No Drawing. Application April 5, 1955, Serial No. 499,533

6 Claims. (Cl. 260—656)

This invention relates to a process for producing chloroethylenes and more particularly to a new and improved process for the catalytic dehydrochlorination of 1,1-dichloroethane and 1,1,1-trichloroethane to produce vinyl chloride and vinylidene chloride, respectively.

In recent years, the chloroethylenes, especially vinyl chloride, have become important and valuable commercial products, particularly as precursors for polymeric materials. While these monomers are relatively inexpensive, there is a considerable incentive for further reduction of their cost of manufacture. Vinyl chloride, for example, is manufactured commercially by two processes: (1) the hydrochlorination of acetylene and (2) dehydrochlorination of 1,2-dichloroethane, formed by the chlorination of ethylene. Both of these raw materials, i.e., ethylene and acetylene, are relatively expensive. The chlorination of ethane provides a potentially cheaper route to vinyl chloride since ethane is a much cheaper raw material than those heretofore employed. This chlorination process, however, results in a mixture of dichlorides containing about 90 percent of the relatively inert 1,1-dichloroethane and only about 10 percent of the presently useful 1,2-dichloroethane. As no commercial method has been available for the conversion of 1,1-dichloroethane to vinyl chloride, the chlorination of ethane route to vinyl chloride could not and has not been used to date. Similar considerations apply to the commercial production of vinylidene chloride.

The conventional method for dehydrochlorination of 1,2-dichloroethane involves a thermal process conducted at temperatures ranging between 500° and 600° C. While catalytic processes are known, the degrees of improvement in either conversion or reduction of reaction temperature is not sufficient to warrant complication of existing processes. In contrast to its isomer, 1,1-dichloroethane requires unduly high temperatures to thermally produce vinyl chloride. Such temperatures are excessively high for commercial use with known materials of construction, and in addition, the feed material is excessively degraded to carbonaceous tars. From a consideration of the behavior of these isomeric materials under thermal conditions, it would not be expected that catalysts for 1,2-dichloroethane dehydrochlorination would appreciably reduce the necessary dehydrochlorination temperature of 1,1-dichloroethane, or that such catalysts as have been disclosed (Ghose et al., Petroleum 14, 261 (1951)) would even proportionally reduce the necessary temperature, relative to its effectiveness with the 1,2-isomer.

In addition to requiring high temperatures for dehydrochlorination of the polychloroethanes, a considerable quantity of chloroprene is always formed in prior processes using either 1,1- or 1,2-dichloroethane. The presence of chloroprene in the product tends to inhibit subsequent polymerization of the vinyl chloride. This chloroprene problem is particularly acute in the thermal dehydrochlorination of 1,1-dichloroethane since the 1,1-dichloroethane and chloroprene have very similar boiling points and cannot be conveniently fractionated or otherwise separated. Thus, if only a part of the 1.1-dichloroethane is dehydrochlorinated in one pass through the thermal reactor, as is true even at extremely high temperatures, and a recycle of unreacted materials is employed, the undesired chloroprene tends to unduly build up in the reactor.

It is accordingly an object of the present invention to provide an improved process for producing chloroethylenes from chloroethanes, and particularly vinyl chloride and vinylidene chloride from ethane. Another object is to provide a process suitable for the dehydrochlorination of 1,1-dichloroethane and 1,1,1-trichloroethane at relatively low temperatures. Still another object is to provide a process of the above type which forms little or no chloroprene as an impurity. Still another object is to provide a catalytic process for the dehydrochlorination of 1,1-dichloroethane in which the catalyst has a long catalyst life. Other objects and advantages of this invention will become apparent from the following description and appended claims.

We have now found that 1,1-dichloroethane and 1,1,1-trichloroethane can be economically and efficiently dehydrochlorinated to produce vinyl chloride and vinylidene chloride thereby permitting the production of these chloroethylenes directly from ethane. This dehydrochlorination process is particularly desirable since it eliminates or materially reduces undesired chloroprene formation and results in essentially high conversions even when carried out at relatively low temperatures. The present dehydrochlorination process for the manufacture of chloroethylenes comprises contacting a polychloroethane of the class consisting of 1,1-dichloroethane and 1,1,1-trichloroethane at a temperature between about 150° and 500° C., preferably below about 320° C., with a dehydrochlorination catalyst selected from the group consisting of metal salts and metal oxides of a metal in Group VI of the periodic table.

The effectiveness of the dehydrochlorination catalysts employed in the present invention in effecting a substantial reduction in the dehydrochlorination temperature of these polychloroethanes, i.e., reductions of up to 350° C., is particularly surprising since these catalysts are known to be relatively inactive in the dehydrochlorination of 1,2-dichloroethane. At the same time the 1,1-dichloroethane is known to be considerably more inert than the 1,2-dichloroethane isomer against dehydrochlorination under thermal conditions. It is surprising then, that the present catalyst can be employed at temperatures below about 400° C., preferably below about 320° C., to selectively dehydrochlorinate the 1,1-dichloroethane in the presence of the 1,2-dichloroethane.

The selective nature of this catalytic process is of great economic importance since 1,2-dichloroethane has many valuable uses not shared by its isomer and their separation, in the past, has been a difficult and costly operation. The present invention therefore provides a novel and useful means for effecting such a separation. The effectiveness of the claimed catalyst is also particularly surprising in that it materially reduces or eliminates the formation of undesired chloroprene. In general, the prior thermal processes result in the formation over a hundred times as much chloroprene as is formed when using the present catalytic process.

The above discovery that 1,1-dichloroethane can be efficiently and economically dehydrochlorinated to vinyl chloride now provides for the first time an economical route to vinyl chloride from a cheap raw material such as ethane. Thus, ethane can be chlorinated, i.e., either thermally or photochemically, to produce an isomeric mixture of dichloroethanes predominating in the 1,1-dichloroethane isomer. This chloroethane mixture can then be subjected to the catalytic dehydrochlorination process of this invention to produce vinyl chloride which is easily separated from any unreacted 1,2-dichloroethane. Alternatively, the ethyl chloride can also be produced in the ethane chlorination step along with the dichloroethanes and recovered as a valuable co-product. When desired, a part of the ethyl chloride so formed can be returned to the chlorination reaction zone for conversion to more dichloroethanes thereby providing a means for controlling the ratio of ethyl chloride to vinyl chloride obtained as products from the combined process.

Catalysts which are suitable for use in the process of the present invention comprise the salts and oxides of the metals of Group VI of the periodic table, including all of the metals in Groups VIA and VIB. The preferred catalysts are the inorganic salts of the metals of this group. Especially preferred in this class are the halides of metals in Group VIB of the periodic table. Other salts of the Group VI metals such as the sulfates, nitrates, phosphates, cyanides, acetates, oxalates, propionates and the like are also suitable for use as catalysts in the present invention. Some specific examples of such compounds which can be used alone or in mixture of two or more thereof are chromic bromide, chromic chloride, chromic iodide, chromic fluoride, chromic oxide, chromic sulfate, chromic phosphate, chromic acetate, chromous chloride, chromous oxalate, molybdenum dibromide, molybdenum pentachloride, molybdenum dioxide, molybdenum trioxide, molybdenum sesquioxide, molybdenum sulfate, molybdenum metaphosphate, tungsten dibromide, tungsten tetrabromide, tungsten pentachloride, tungsten hexachloride tungsten iodide, tungsten trioxide, selenium monobromide, selenium bromotrichloride, selenium tetrachloride, selenium dioxide, selenium acetate, selenium phosphate, tellurium dibromide, tellurium tetrabromide, tellurium dichloride, tellurium tetrachloride, tellurium tetraiodide, tellurium basic nitrate, tellurium dioxide, tellurium trioxide and tellurium oxysulfate. Also suitable as catalysts for this process are those compounds which are converted into halides and/or oxides of the metals described above, under the reaction conditions employed. When employing a halogen salt, it is generally preferable to employ the chlorides of the above metals since they are usually the most economical and most readily obtainable of the halogen salts.

The catalyst can be used as such or can be admixed with or deposited upon a suitable carrier such as pumice, silica, silica gel, asbestos, charcoal, fuller's earth activated alumina, magnesia, silica alumina, diatomaceous earths and the like. Particularly preferred catalysts comprise finely divided activated alumina impregnated with a metal halide, particularly chromic chloride. When using the carrier material, the active catalyst component generally comprises about 0.1 to 30 percent by weight of the catalytic mixture employed.

In practice, the process of the preesnt invention comprises contacting 1,1-dichloroethane or 1,1,1-trichloroethane or mixtures thereof with the above described catalyst at a temperature between about 150° and 500° C. The dehydrochlorination proceeds smoothly and rapidly so as to convert a considerable amount, frequently up to about 100 percent, of the polychloroethane to the desired chloroethylene. The product mixture is withdrawn from the reaction zone and can be passed directly to a condenser, thereby recovering the condensable materials while allowing the hydrogen chloride formed in the reaction to pass overhead to a recovery system. Alternatively, the product gases from the reaction zone can be passed through a hydrogen chloride recovery system prior to condensing the higher boiling chloroethylenes and unreacted feed stock. If desired, unreacted 1,1-dichloroethane or 1,1,1-trichloroethane can be recycled to the reaction zone in order to obtain a more complete conversion of feed material to the desired product.

The reaction can be conducted in a wide variety of reaction vessels and can be a continuous or batch operation. The preferred operation involves a continuous vapor phase reaction using a packed or fluidized reactor. In the latter cases, the above described catalyst is preferably deposited on a carrier as hereinbefore described and employed as a lump, pelleted, granular or finely divided material. When it is desired to use a packed bed type of reactor, this catalyst material will usually be present in the form of particles of a size small enough to provide large surface areas for maximum contact with the reactant gases. For use in this type of reactor, it has been found that a particle size of from about 3 to 12 mesh size is very satisfactory; 6 to 10 mesh being a preferred size. In one embodiment of the present invention, the catalyst bed can be of the fluid bed type so as to provide the most efficient contact between the catalyst and the reactants. While the particle size is not especially critical in this type of operation, it is important and it is normal to employ a fluidizing media having an average particle size between about 50 to 250 mesh and preferably between about 70 and 200 mesh. Particles much less than 250 mesh are sometimes suitable for a fluidized bed reaction but such particles tend to be entrained with the product vapors, whereas particles having a diameter above 50 mesh result in mechanical difficulties in the fluidized technique. The catalyst can be fluidized by the passage of the gaseous reactant therethrough at a superficial linear velocity of about 0.1 to 50 feet per second, the actual range depending on whether a stationary or transport bed is employed. For a stationary fluid bed system it is generally preferred to employ a superficial linear velocity of about 0.3 to 3 feet per second, while velocities of about 4 to 10 feet per second are preferred for transport or moving bed systems.

The fluidized bed can be of a conventional type employing any suitable fluidizing means and can utilize any desired temperature controlling means, either internal or external. When desired, however, the catalyst can be removed from the reaction zone and easily regenerated by techniques well known to those skilled in the art.

In general, it is suitable to use pure 1,1-dichloroethane or 1,1,1-trichloroethane as the feed material in the process so as to obtain maximum benefits of the preesnt invention. However, when desired, it is sometimes preferred to employ a feed stream having other alkanes or chlorinated alkanes therein, such for example as 1,2-dichloroethane. In the latter case, it has been found that this component does not react during the concomitant dehydrochlorination of the 1,1-dichloroethane or 1,1,1-trichloroethane at temperatures below about 400° C.

In general, the reaction rate is dependent upon and increases with an increase in the temperature employed. In the present process, suitable reaction rates are obtained at temperatures as low as about 150° C. Generally temperatures between about 150° and 500° C., and preferably between about 250° and 320° C. are employed in the process. Temperatures below 150° C. tend to give uneconomically low conversions. Temperatures above about 500° C. can be used but are generally uneconomical since they frequently result in excessive degradation of the reactants and products to form carbonaceous deposits. Higher temperatures also lead to excessively high corrosion rates of those materials of which the reactor equipment is normally constructed. Moreover, when it is desired to preferentially dehydrochlorinate 1,1-dichloroethane or 1,1,1-trichloroethane in the co-presence of 1,2-dichloroethane, the process can be conducted at a temperature between about 150° and 350° C., preferably between about 250° and 320° C.

A wide range of pressures are suitable for this invention. While atmospheric pressure operation is suitable in many cases, it is generally preferred to operate at superatmospheric pressure for more efficient conversions to the desired products and more economical recovery of these products from the reaction zone. In practice, pressures in the range of about 1 to 20 atmospheres are preferred, although higher pressures can be used with less satisfactory results.

The reaction or contact time is important. When conducting the process in the vapor phase, the linear velocity of the gaseous material passing through the reaction zone can be controlled to obtain the necessary contact time between reactant and catalyst to promote the desired dehydrochlorination reaction. In general, the most advantageous contact period is dependent upon several variables, such as the scale of the operation, quantity of catalyst in the reactor and the type of reactor employed. For most reactors, it has been found that a contact time of as high as about 25 seconds and as low as about 0.5 second is suitable for the present process. With a contact time below about 0.5 second, the product frequently contains considerable quantities of unreacted feed material. Above about 25 seconds, the impurities tend to increase and the product becomes more difficult to recover in a pure form. For optimum production of a high quality product, however, it is generally preferred to employ a contact period of not more than about 10 seconds.

Various process equipment are suitable for use with the present invention. These can be constructed of any of a large number of common and inexpensive materials. This is in contrast to prior processes requiring costly alloys for high temperature operation. Thus, this process can be conducted in iron or ferrous metal reactors without excessive corrosion of the reactor walls.

The following examples describe typical embodiments of this process and are given to illustrate the invention in more detail. All quantities in these examples are given in parts by weight.

*Example I*

This example illustrates the benefits obtained by the present invention when the process is conducted in a fixed or packed bed type of reactor. The catalysts employed in the following runs were prepared by mixing a solution of 15 parts of the metallic catalyst, e. g., $CrCl_2$, $CrF_3$, $MoCl_5$, $WBr_5$ $WI_4$, $TeCl_4$ $TeI_4$, $TeO_2$, $SeCl_2$, $SeO_2$, in 200 parts of water with 300 parts of a diatomaceous earth, i. e., cellite (8–12 mesh) and drying the mixture in a vacuum oven for 9 hours. The dried material was then ground in a ball-mill and screened to obtain particles between 6 to 10 mesh in size.

A liquid 1,1-dichloroethane feed stream is fed to a vaporizer and the resultant vapors are then passed through a heated reactor tube packed with the catalyst material prepared as described above. The feed rate is regulated so as to permit a contact time of about 2.5 seconds at a reaction temperature of about 300° C. The conversions of 1,1-dichloroethane to vinyl chloride are above 70 percent.

When 1,1,1-trichloroethane is employed in the place of 1,1-dichloroethane in this example, the conversions to vinylidene chloride are above 90 percent.

In a comparative series of runs in which the feed material is 1,2-dichloroethane, conditions being otherwise the same as above, essentially no reaction is obtained, all of the feed material being recovered in an unreacted form.

*Example II*

This comparative example demonstrates the relative difficulty of dehydrochlorinating 1,1-dichloroethane in the absence of catalysts of the present invention. Thus, at temperatures as high as 500° C. and in the absence of any catalyst, 1,2-dichloroethane has a dehydrochlorination rate about 5 times as fast as the 1,1-dichloroethane.

Table I summarizes the results obtained when the procedure of Example I was repeated except that the reaction zone did not contain any catalytic material and the reaction conditions were varied as shown.

TABLE I

| Catalyst | Feed Material | Reactor Temperature (° C) | Conversion to $C_2H_3Cl$ (percent) |
|---|---|---|---|
| None | 1,1-dichloroethane | 500 | 6.0 |
| Do | 1,2-dichloroethane | 500 | 30.0 |

It should be noted that even at much higher temperatures, i. e., 500° C., the catalytic dehydrochlorination rate of the 1,1-dichloroethane is less than 1/10 the rate obtained in Example I.

*Example III*

This example illustrates the method of advantageously conducting the present invention in a stationary fluidized bed type reactor. The same feed system and recovery system employed in the process of Examples I and II were used in this example. The catalyst was prepared as in Example I except that the carrier was activated alumina and the mixture was ground so as to obtain a particle size distribution between about 70 and 200 mesh, with an average particle size of about 150 mesh. This catalyst material was packed into the reactor tube so as to occupy approximately one-half of the void space when at rest. The finely divided particles were maintained in a fluidized state by the flow of the reactant gases through the reaction zone. Liquid 1,1-dichloroethane was vaporized and the vapors passed through the fluidized bed reaction zone at a rate of 5.4 moles per hour and at a superficial linear velocity of about 1 foot per second based on the empty reactor.

In a comparative run, 1,2-dichloroethane was employed as a feed material instead of 1,1-dichloroethane. The comparative results are shown in Table II.

TABLE II

| Catalyst | Feed Material | Reactor Temperature (° C.) | Contact Time (sec.) | Conversion to $C_2H_3Cl$ (percent) |
|---|---|---|---|---|
| $CrCl^3$ | 1,1-dichloroethane | 300 | 0.8 | 75.1 |
| | 1,2-dichloroethane | 300 | 2.5 | 0.5 |

The results given in Table II show the excellent conversions of 1,1-dichloroethane to vinyl chloride when subjected to the low reaction temperatures and short contact times of the process of the present invention. It should also be noted that when 1,2-dichloroethane was employed as the feed material no appreciable dehydrochlorination was obtained even at 3 times the contact period employed for the 1,1-dichloroethane.

*Example IV*

This example contrasts the tremendous reduction in the formation of chloroprene during the dehydrochlorination of 1,1-dichloroethane in the process of this invention with prior thermal processes and the results obtained are given in Table III below. The apparatus and procedures employed in the runs shown in Table III were similar to those of Example III.

TABLE III

| Catalyst | Feed Material | Reactor Temperature (° C.) | Conversion to $C_2H_3Cl$ (percent) | Chloroprene Formation (percent) |
|---|---|---|---|---|
| $CrCl_3$ | 1,1-dichloroethane | 300 | 75 | .02 |
| None | do | 540 | 50 | 3.0 |

As noted in these results, even at lower conversion levels, the thermal non-catalytic process produces over a hundred times as much chloroprene as the catalytic process of this invention. The reduction in chloroprene formation is extremely important in those process operations wherein only a part of the dichloroethane is dehydrochlorinated per pass thereby necessitating the recycle of unreacted reactants in order to obtain a more complete utilization of the raw materials. Since it is extremely difficult to separate the 1,1-dichloroethane from any co-present chloroprene due to their close physical and chemical properties, the chloroprene builds up to an untenable concentration after only a few passes. In the present process, however, the low chloroprene formation eliminates the problem. Moreover, if desired, it is now possible to obtain essentially 100 per cent conversion of the dichloroethane in the present invention with essentially no chloroprene formation as well as eliminating the need of any recycle operation.

*Example V*

The runs in this example were conducted to demonstrate the long catalyst life exhibited by the catalysts employed in the present invention. The procedures employed were the same as in Example III and the results obtained over a 3-hour period using $CrCl_2$, $Cr_2O_3$, $CrBr_3$, $MoCl_5$, $MoO_3$, $WBr_2$, $WCl_6$, $WO_3$, $TeCl_4$, or $SeO_2$ as the catalytic materials in different runs showed a continuing high level of conversion of 1,1-dichloroethane to vinyl chloride.

*Example VI*

In this example the runs of Example III are repeated except that 1,1,1-trichloroethane is employed as the polychloroethane. Under similar procedures and reaction conditions as used in Example III, the conversion to vinylidene chloride is above 90 percent.

*Example VII*

In this example the runs of Example III are repeated except that the catalysts deposited on the activated alumina carrier are chromic iodide, chromic fluoride, molybdenum dibromide, tungsten tetrabromide, tungsten iodide, selenium tetrachloride, tellurium dibromide, tellurium dichloride and tellurium tetraiodide. The reaction conditions are the same as those employed in Example III and the conversions of 1,1-dichloroethane to vinyl chloride are above 70 percent in all the runs.

*Example VIII*

The procedures of Example III are repeated in this example except that the catalysts deposited on the activated alumina carrier are chromous oxide, chromic sulfate, chromic phosphate, chromic acetate, molybdenum sesquioxide, molydenum sulfate, molybdenum metaphosphate, tungsten oxytetrabromide, selenium acetate, selenium phosphate, and tellurium basic nitrate. Under the same reaction conditions as employed in Example III the conversions of 1,1-dichloroethane to vinyl chloride are above 60 percent in all of the runs.

Similarly, equally good results are also obtained when using other catalysts of the present invention such as chromous fluoride, chromous oxalate, molybdenum dioxide, selenium monobromide, selenium bromotrichloride, tellurium tetrabromide, tellurium trioxide, and tellurium oxysulfate in the illustrative examples given above.

Reaction temperatures as low at 150° C. and as high as 500° C. when employed in similar examples produce essentially comparable results.

As is apparent from the above, the present invention provides an improved process for the economical dehydrochlorination of a cheap raw material, i. e., 1,1-dichloroethane and 1,1,1-trichloroethane, to a valuable product, i. e., the corresponding chloroethylenes. The process also provides a novel and economical route to the manufacture of vinyl chloride from ethane which includes a chlorination and catalytic dehydrochlorination operation. The present process involves the use of a selective catalyst for dehydrochlorinating these polychloroethanes at a temperature between about 150° and 500° C. The selective nature of the catalyst is further emphasized by the ability to selectively dehydrochlorinate 1,1-dichloroethane in the presence of its isomer, 1,2-dichloroethane thereby permitting the recovery of a relatively pure co-product which is particularly valuable as a scavenger in motor fuels.

I claim:

1. A process for the manufacture of chloroethylenes which comprises contacting a polychloroethane of the class consisting of 1,1-dichloroethane and 1,1,1-trichloroethane at a temperature between about 150° and 500° C. with a catalyst selected from the group consisting of metal salts and metal oxides, said metal being in Group VI of the periodic table.

2. The process of claim 1 wherein the metal salts are metal halides.

3. The process of claim 1 in which the catalyst is supported on a carrier.

4. A process for the manufacture of vinyl chloride which comprises contacting gaseous 1,1-dichloroethane in a fluidized bed reaction zone at a temperature between about 250° and 320° C. with a catalyst supported on a carrier, said catalyst being selected from the group consisting of metal halides and metal oxides, said metal being in Group VIB of the periodic table.

5. The process of claim 4 wherein the catalyst is chromic chloride and the carrier is activated alumina.

6. In a process for the manufacture of vinyl chloride wherein a mixture of 1,1-dichloroethane and 1,2-dichloroethane is employed as a feed material the improvement which comprises the step of contacting the mixture of 1,1-dichloroethane and 1,2-dichloroethane at a temperature between about 150° and 320° C. with a catalyst selected from the group consisting of metal halides and metal oxides, said metal being in Group VI of the periodic table and separately recovering vinyl chloride and 1,2-dichloroethane therefrom.

References Cited in the file of this patent

UNITED STATES PATENTS

| | | |
|---|---|---|
| 2,098,400 | Pier et al. | Nov. 9, 1937 |
| 2,399,488 | Hearne | Apr. 30, 1946 |
| 2,676,997 | Brown et al. | Apr. 27, 1954 |